United States Patent
Huang et al.

(10) Patent No.: US 8,446,919 B2
(45) Date of Patent: May 21, 2013

(54) SERVICE SWITCHING METHOD, SYSTEM, AND DEVICE

(75) Inventors: Yong Huang, Shenzhen (CN); Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 12/823,966

(22) Filed: Jun. 25, 2010

(65) Prior Publication Data

US 2010/0265946 A1   Oct. 21, 2010

Related U.S. Application Data

(63) Continuation of application No. PCT/CN2008/073739, filed on Dec. 25, 2008.

(30) Foreign Application Priority Data

Dec. 27, 2007  (CN) .......................... 2007 1 0301766
Feb. 2, 2008   (CN) .......................... 2008 1 0006839

(51) Int. Cl.
*H04J 3/17*          (2006.01)
(52) U.S. Cl.
USPC ......................................... 370/468; 370/433
(58) Field of Classification Search
USPC .......... 370/431–433, 438, 464–468; 709/245, 709/247
See application file for complete search history.

(56) References Cited

U.S. PATENT DOCUMENTS

| | | | |
|---|---|---|---|
| 2003/0135594 A1 | 7/2003 | Xu et al. | |
| 2004/0122975 A1 | 6/2004 | Lennestal et al. | |
| 2006/0248197 A1* | 11/2006 | Evans et al. | 709/227 |
| 2007/0266398 A1 | 11/2007 | Vandaele | |
| 2008/0274759 A1* | 11/2008 | Chen et al. | 455/507 |

FOREIGN PATENT DOCUMENTS

| | | |
|---|---|---|
| CN | 1751303 A | 3/2006 |
| CN | 101009825 A | 8/2007 |
| CN | 101030961 A | 9/2007 |
| CN | 101072337 | 11/2007 |
| CN | 100412844 C | 8/2008 |
| CN | 101471805 A | 7/2009 |
| EP | 1 855478 | 11/2007 |
| WO | WO 2007/098703 A1 | 9/2007 |

OTHER PUBLICATIONS

Written Opinion of the International Searching Authority dated Apr. 2, 2009 in connection with International Patent Application No. PCT/CN2008/073739.

"Telecommunications and Internet Converged Services and Protocols for Advanced Networking (TISPAN); IPTV Architecture; IPTV functions supported by the IMS subsystem", Sep. 2007, ETSI, 67 pages.

Partial Translation of Office Action dated Jun. 23, 2010 in connection with Chinese Patent Application No. 200810006839.0.

(Continued)

*Primary Examiner* — Kerri Rose

(57) ABSTRACT

A service switching method, system, and device are provided. The method includes: receiving a control message for switching between a unicast service and a multicast service; and reusing access line resources of the multicast service when the multicast service is switched to the unicast service, or reusing access line resources of the unicast service when the unicast service is switched to the multicast service according to the control message.

11 Claims, 11 Drawing Sheets

OTHER PUBLICATIONS

H. Schulzrinne, et al., "Real Time Streaming Protocol (RTSP)", Apr. 1998, 92 pages.

"Draft Recommendation Y.RACF Version 9.2", ITU-Telecommunication Standardization Sector, Study Period 2005-2008, Apr. 22-27, 2006, 70 pages.

Partial Translation of Second Office Action dated Dec. 31, 2011 issued in Chinese Application No. 200810006839.0.

International Search Report issued Apr. 2, 2009 in connection with International Patent Application No. PCT/CN2008/073739.

"Telecommunications and Internet Converged Services and Protocols for Advanced Networking (TISPAN); Resource and Admission Control Sub-system (RACS); Functional Architecutre; Release 2", Dec. 2006, ETSI, 86 pages.

European Search Report issued Feb. 28, 2012 in connection with European Patent Application No. 08870912.6, 7 pages.

Siemens; "Clarification of PCC impacts in IMS Multicast Services" 3GPP TSB SA WG2 Architecture; Feb. 12-15, 2007, 5 pages.

Ericsson; "Fast Channel Switching for PSS based Mobile TV"; 3GPP TSG-SA4#40 Aug. 28-Sep. 1, 2006, 3 pages.

Translation of Third Chinese Office Action dated Mar. 31, 2012 in connection with Chinese Patent Application No. 200810006839.0, 5 pages.

* cited by examiner

SERVICE SWITCHING METHOD, SYSTEM, AND DEVICE

CROSS-REFERENCE TO RELATED APPLICATIONS

The application is a continuation of International Application No. PCT/CN2008/073739, filed on Dec. 25, 2008, which claims priority to Chinese Patent Application No. 200710301766.3, filed on Dec. 27, 2007 and Chinese Patent Application No. 200810006839.0, filed on Feb. 2, 2008, all of which are hereby incorporated by reference in their entireties.

TECHNICAL FIELD

The present invention relates to the field of network technologies, and more particularly to a service switching method, system, and device.

BACKGROUND

A Time-Shifted TV (TSTV) in the prior art is implemented as follows. The stored TV programs are displayed in columns on a client interface according to a preset program schedule of each channel. When a user chooses a TV program at a certain time interval through the Electronic Program Guide (EPG), the system quickly locates a time point of a corresponding media file to play. The most regular TSTV solution is to add the capability of cache and video playing signaling processing on a Broadcast TV (BTV) server.

Currently, a TSTV service and a BTV service are closely associated, and a video stream occupies a larger network bandwidth. Particularly, in an access line, the average access bandwidth of a typical Asymmetric Digital Subscriber Line (ADSL) access line is 6 M to 8 M, while a video stream encoded by Moving Pictures Experts Group-2 (MPEG-2) generally occupies a bandwidth of more than 4 M. In a network over access nodes (ANs), as a TSTV program is in a unicast form, while an original BTV program is in a multicast form, when the user switches from one channel of the BTV to the time-shifted mode, unicast resources need to be newly allocated. In other words, a unicast bandwidth needs to be newly allocated before the bandwidth occupied by the multicast is released, so that the bandwidth becomes inadequate, which raises new requirements on resource allocation.

The solution in the prior art adopts the original unicast and multicast architecture of Next Generation Network (NGN). During switching from the BTV service to the TSTV service, the BTV service is terminated and the resources thereof are released, and then the resources of the TSTV service are applied for, so that the BTV service and the TSTV service originally associated are processed separately, which greatly lowers the switching speed and deteriorates the user experience. Further, the application for the resources of the TSTV may cause a resource admission failure due to the fact that the resources have already been occupied by other services, which may directly result in that the time-shifted service cannot be provided. During switching from the TSTV service to the BTV service, a similar process of firstly releasing and then applying for the resources also exists, and, likewise, the switching speed is lowered.

SUMMARY

The present invention is directed to a service switching method, system, and device, capable of associating a BTV service with a TSTV service, so as to improve the success ratio of switching from the BTV service to the TSTV service, and raise the switching speed.

In order to achieve the above objective, in an embodiment, the present invention provides a service switching method, which includes the following steps.

A control message for switching between a unicast service and a multicast service is received.

According to the control message, access line resources of the multicast service are reused when the multicast service is switched to the unicast service, or access line resources of the unicast service are reused when the unicast service is switched to the multicast service.

In an embodiment, the present invention further provides a service switching system, which includes a service controller, a resource manager, a network edge node, and a user terminal.

The service controller is configured to receive a request for switching between a unicast service and a multicast service, and send a resource reuse indication as a control message to the resource manager, so as to instruct the resource manager to reuse access line resources during switching between the unicast service and the multicast service.

The resource manager is configured to receive the resource reuse indication sent by the service controller, and send a resource reuse operation indication as a control message to the network edge node, so as to reuse the access line resources during switching between the unicast service and the multicast service.

The network edge node is configured to reuse the access line resources during switching between the unicast service and the multicast service according to the resource reuse operation indication sent by the resource manager, or according to a multicast join request message sent by the user terminal.

The user terminal is configured to send the request for switching between the unicast service and the multicast service to the service controller, or send the multicast join request to the network edge node, so as to request to switch between the unicast service and the multicast service.

In an embodiment, the present invention further provides a network device, which includes a service controller. The service controller includes a first receiving unit, a first indication generating unit, and a first indication sending unit.

The first receiving unit is configured to receive a request from a user terminal for switching from a multicast service to a unicast service.

The first indication generating unit is configured to generate a resource reuse indication sent to a resource manager according to the request received by the first receiving unit. The resource reuse indication serves as a control message, and is used for instructing the resource manager to reuse access line resources during switching between the unicast service and the multicast service.

The first indication sending unit is configured to send the resource reuse indication generated by the first indication generating unit to the resource manager.

In an embodiment, the present invention further provides a network device, which includes a receiving unit and a processing unit.

The receiving unit is configured to receive a control message for switching between a unicast service and a multicast service.

The processing unit is configured to reuse access line resources of the multicast service when the multicast service is switched to the unicast service, or reuse access line resources of the unicast service when the unicast service is switched to the multicast service according to the control message sent by the receiving unit.

The present invention has the following advantages as compared with the prior art.

A resource request carrying a resource reuse indication is sent to enable reuse of multicast service resources and unicast service resources, so as to avoid the problem of insufficient access line resources that may occur during the service switching. Further, the reuse of the resources reduces the time of dark screen for the user terminal, and improves the user experience.

DETAILED DESCRIPTION

The present invention is illustrated below with reference to some embodiments and the accompanying drawings.

Figure 1:
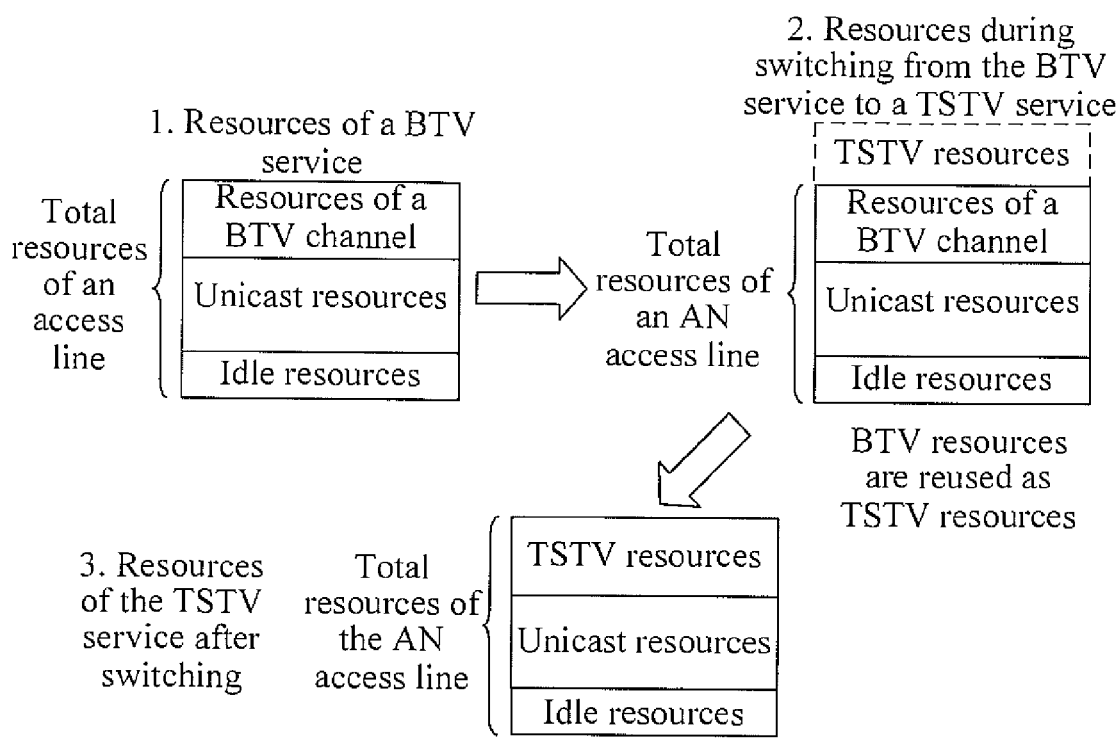
FIG. 1 is a schematic view of a resource variation process during reuse of BTV and TSTV resources according to an embodiment of the present invention.

In an embodiment, the present invention provides a service switching method, which associates a BTV service with a TSTV service in NGN architecture. Specifically, in the NGN architecture, the multicast resource control is generally completed on a distributed network edge node (for example, a broadband remote access server (BRAS), a service router (SR), a broadband network gateway (BNG), or an access point (AN); while the unicast resource control is generally completed on an independent resource manager. At the time of starting a multicast service, access line resources are quite limited. In the process of switching from the BTV service to the TSTV service, if the unicast resources occupied by the TSTV service and the multicast resources occupied by the BTV service are processed respectively, the resource admission failure may be caused that resources on the access line are not enough to simultaneously bear unicast and multicast streams. In order to prevent such case, for the access line resources that need to be occupied by the TSTV service, the resources occupied by the corresponding original BTV service are reused in the embodiment of the present invention. In the embodiment of the present invention, the process of switching from the BTV service to the TSTV service is taken as an example, and a schematic view of a variation process of the access line resources is as shown in FIG. 1.

In the embodiment of the present invention, in the process of switching from the BTV service to the TSTV service, the resources of the BTV service are reused as the resources required by the TSTV service, and no additional idle resources are occupied. In this manner, not only the resource space of the access line can be saved, but also the success ratio of the service switching can be improved. In view of the resource admission, it can be considered that the TSTV service performs an overbook operation on the access line resources.

Embodiments of the present invention are further described in detail below with reference to the accompanying drawings.

In a first embodiment, the present invention provides a method for implementing a TSTV service in NGN architecture. In the architecture, under a condition that an AN manages multicast access resources and a resource manager manages unicast resources, the method for switching from the BTV service to the TSTV service is described in detail, and the resource reuse of the BTV service and the TSTV service is realized. In this embodiment, the access line, that is, the access line resources, is divided into two parts. One part is managed by the AN for multicast admission control, and the other part is managed by the resource manager for unicast admission control.

Figure 2:
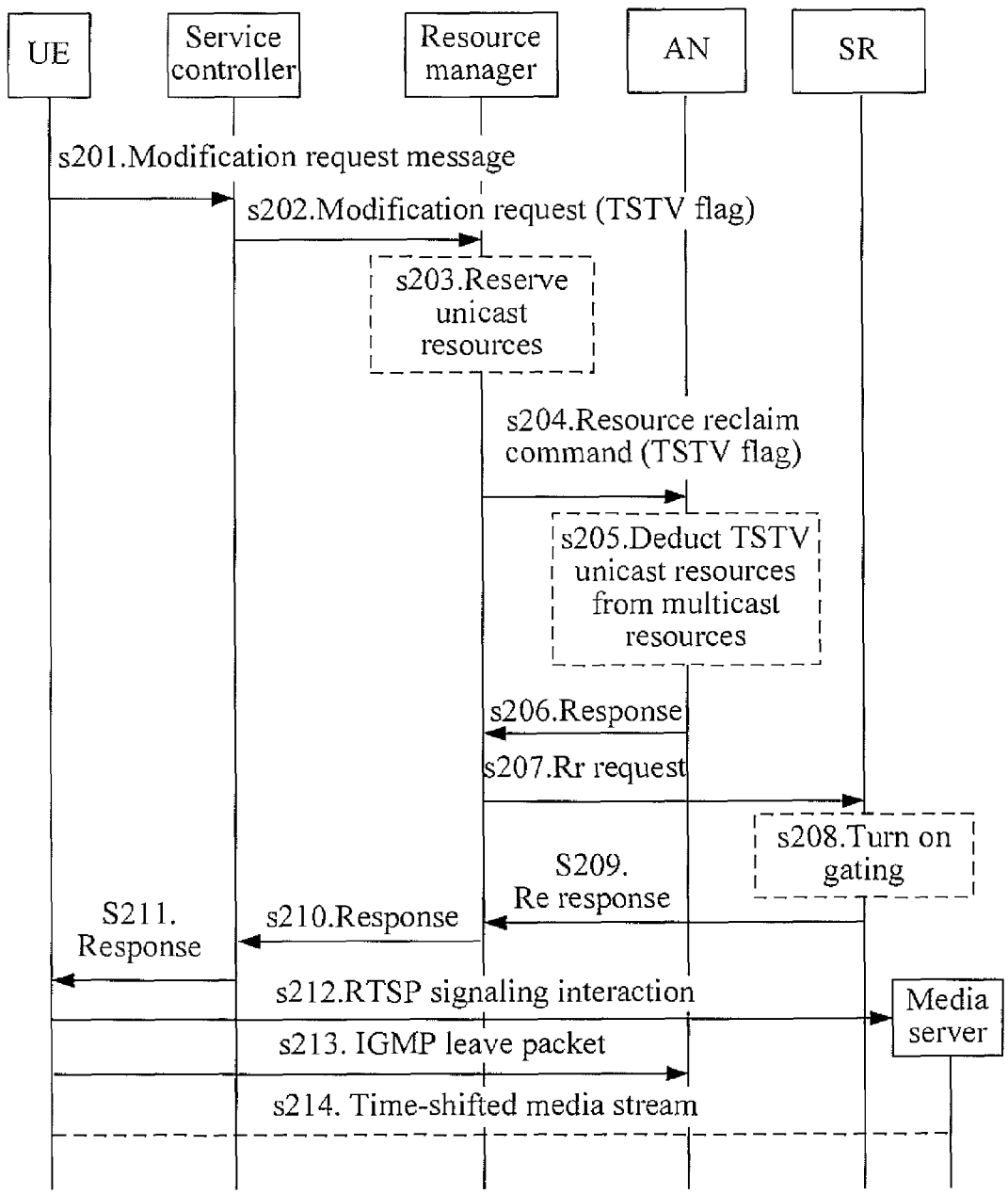
FIG. 2 is a flow chart of switching from a BTV service to a TSTV service by using a resource reuse solution according to a first embodiment of the present invention.

The process of switching from a BTV service to a TSTV service is as shown in FIG. 2, which includes the following steps.

In step s201, a user equipment (UE) initiates a modification request message in a BTV session.

Specifically, an identification of a channel program being watched and a time-shifted request are carried in the modification request message to notify a service controller to choose a media server for a unicast video and reserve a bandwidth for a media channel. The identification of the channel program being watched by the UE may also be sent previously for the operator to collect statistics on audience ratings.

In step s202, the service controller chooses the media server, places a server address in a quintuple (including a source address, a source port, a destination address, a destination port, and a protocol), and sends the modification request message to the resource manager by using an original BTV resource request session. The message carries a resource reuse indication (such as a TSTV flag or a resource overbook flag, or an original multicast stream is modified into a unicast stream, and the resource manager considers by default this modification as reuse of the multicast resources for unicast on the access line) to instruct the resource manager to reuse the resources currently allocated to the multicast stream on the access line when applying for resources for the TSTV service.

In step s203, the resource manager reserves the unicast resources except for the access line for the request.

In step s204, the resource manager sends a resource reclaim command through a control interface with the AN, transfers a resource reuse operation indication (such as overbook or TSTV indication information), and reclaims the resources being used for multicast as the resources for unicast, so as to implement resource reuse on the TSTV access line.

In step s205, the AN finds BTV control data corresponding to the TSTV from a corresponding user port managed by the AN itself, without deducting the TSTV unicast resources from idle resources, and records a corresponding state to process an Internet Group Multicast Protocol (IGMP) packet. Further, if the indication information is the TSTV flag, the AN may act as an agent of a Real-Time Streaming Protocol (RTSP) request sent to the server by identifying an address of the media server. (After executing this step, the multicast stream may be interrupted in a delayed manner to prevent an IGMP leave packet of the user from getting lost in step s213. Alternatively, the multicast stream may also be interrupted after the IGMP leave packet is received in step s213.)

In step s206, the AN responds to the resource manager.

In step s207, the resource manager sends a strategy installation request to an SR to turn on a gating switch and allow a server video stream to enter the network. In this step, if multiple SRs exist, the resource manager may get a media server address from quintuple information, and then get an SR address through which the media server is connected to the network through local configuration information.

In step s208, the SR performs a gating operation to turn on the gating.

In step s209, the SR responds to the resource manager.

In step s210, the resource manager responds to the service controller.

In step s211, the service controller responds to the UE, indicating that the TSTV unicast media stream resources have been reserved, and informs the UE of the media server address.

In step s212, the UE performs RTSP signaling interaction with the media server to establish a control connection.

In step s213, the UE sends the IGMP leave packet to the AN. The AN performs a special resource operation according to a stored TSTV identifier. If the multicast resources are first released and then applied for during channel switching in a normal situation, the release action may not be executed anymore as the resources have already been occupied by the TSTV service. If the resources are kept unchanged during channel switching in a normal situation (such operation is possible in a case that the channels occupy the same resources), the multicast resources need to be released as the corresponding resources have already been occupied by the unicast service and are managed by the resource controller, and the sending of the multicast resources to a multicast medium of the UE is interrupted.

In step s214, the time-shifted media stream is sent to the UE by the media server, and may also be sent to the UE by an RTSP agent.

Figure 3:
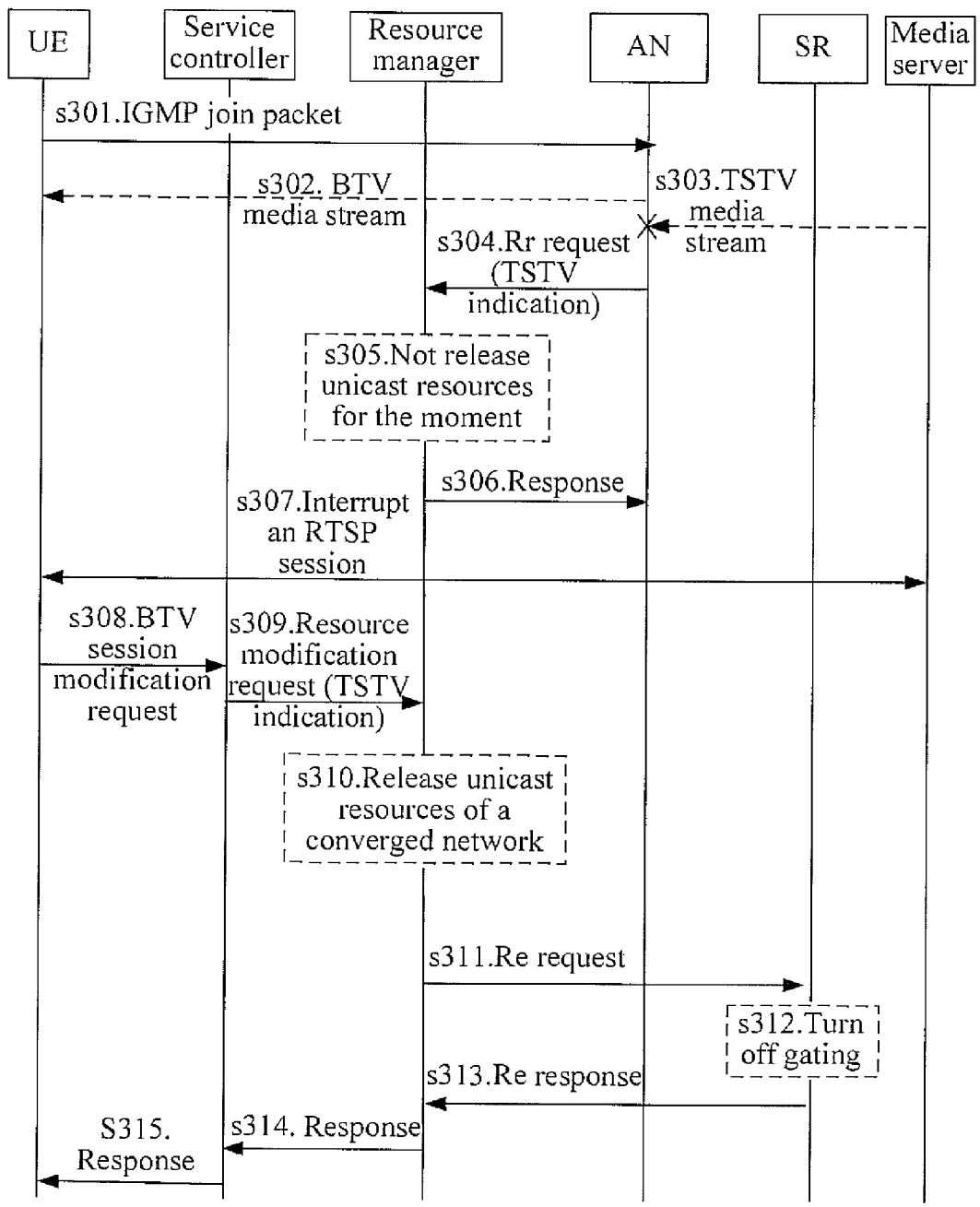
FIG. 3 is a flow chart of switching from the TSTV service to the BTV service by using the resource reuse solution according to the first embodiment of the present invention.

In the embodiment of the present invention, the process of switching from a TSTV service to a BTV service is as shown in FIG. 3, which includes the following steps.

In step s301, the UE sends an IGMP join packet to watch a BTV program of a current channel or other channels.

In step s302, the AN performs normal channel switching to send the BTV program to the UE.

In step s303, the AN stops sending a unicast time-shifted media program to a user port where the UE is located.

In step s304, the AN sends a request for releasing unicast resources to the resource manager to require reclaiming the unicast resources occupied by the TSTV as multicast resources.

In step s305, the resource manager may choose to release the allocated unicast resources except for the access line. Taking that the user may perform time-shifting again into account, the resources are not released for the moment herein.

In step s306, the resource manager responds to the AN.

In step s307, the UE interrupts an RTSP session, and the media server does not send a unicast stream any more.

In step s308, the UE sends a session modification request to the service controller to terminate the time-shifting.

In step s309, the service controller sends a resource modification request to the resource manager, where the request carries a line resource reuse indication.

In step s310, the resource manager releases the unicast resources except for the access line.

In step s311, the resource manager sends a request to the SR for turning off the gating.

In step s312, the SR performs a gating operation to turn off the gating.

In step s313, the SR responds to the resource manager.

In step s314, the resource manager responds to the service controller.

In step s315, the service controller responds to the UE. So far, the session restores to the original BTV session state.

It should be noted that, the above steps s304 to s306 are for notifying the resource manager that it is allowed to release in advance the unicast resources occupied by the TSTV media stream. These steps are optional.

Figure 4:
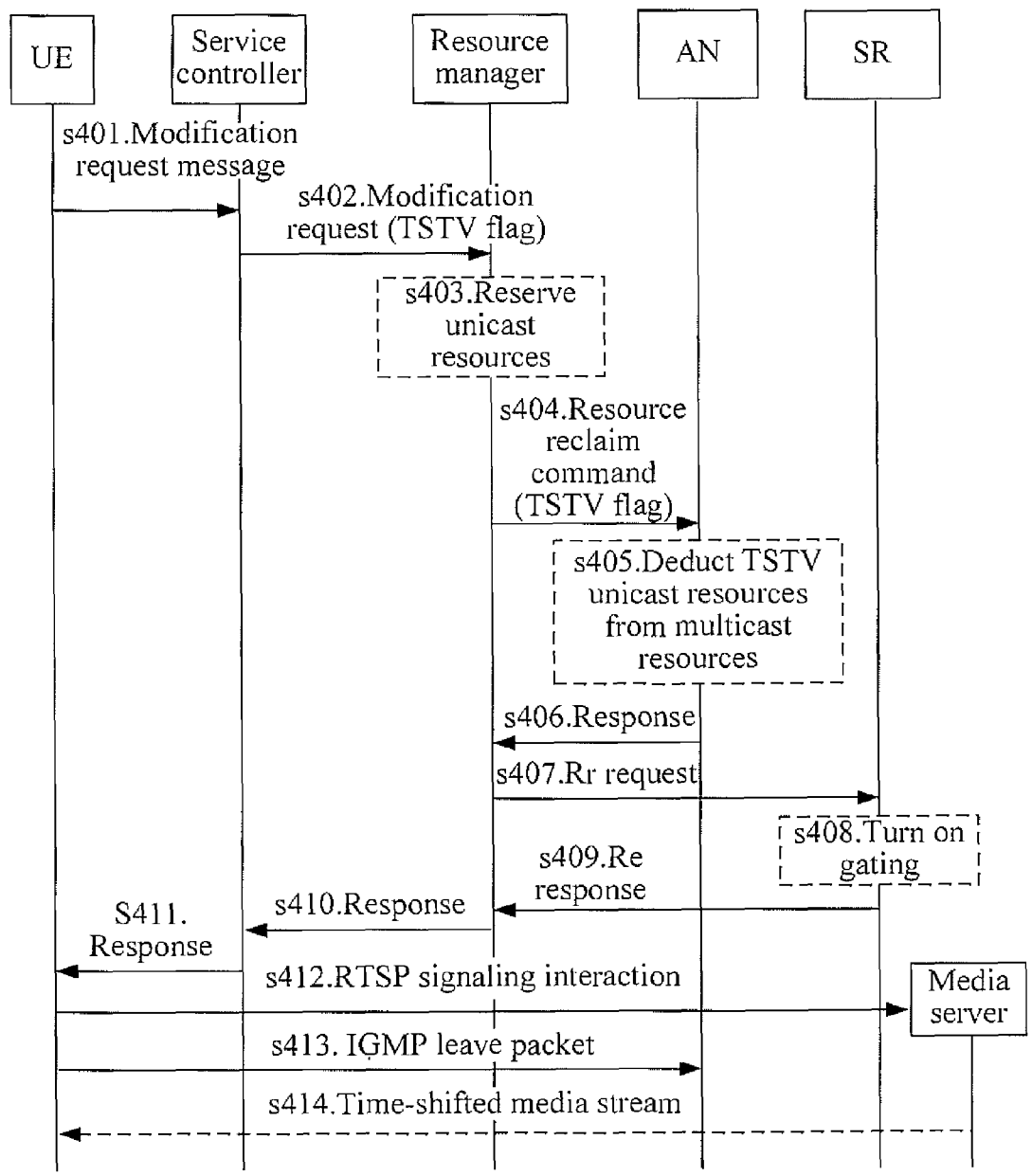
FIG. 4 is a flow chart of switching from a BTV service to a TSTV service by using a resource reuse solution according to a second embodiment of the present invention.

A second embodiment of the present invention is implemented under a condition that an AN manages all access line resources and a resource manager manages non-access resources. The process of switching from a BTV service to a TSTV service is as shown in FIG. 4, which includes the following steps.

In step s401, a UE initiates a modification request message in a BTV session.

Specifically, an identification of a channel program being watched and a time-shifted request are carried in the modification request message to notify a service controller to choose a media server for a unicast video and reserve a bandwidth for a media channel. The identification of the channel program being watched by the UE may also be sent previously for the operator to collect statistics on audience ratings.

In step s402, the service controller chooses the media server, places a server address in a quintuple (including a source address, a source port, a destination address, a destination port, and a protocol), and sends the modification request message to the resource manager by using an original BTV resource request session. The message carries a resource reuse indication (such as a TSTV flag or a resource overbook flag, or an original multicast stream is modified into a unicast stream, and the resource manager considers by default this modification as reuse of the multicast resources for unicast on the access line) to instruct the resource manager to reuse the resources currently allocated to the multicast stream on the access line when applying for resources for the TSTV service.

In step s403, the resource manager reserves the unicast resources except for the access line for the request.

In step s404, the resource manager sends a request carrying a resource reuse operation indication through an interface in connection with the AN, and transfers resource overbook or TSTV indication information. The AN receives the request carrying the indication information, and reclaims the resources being used for multicast as the resources for unicast, so as to implement resource reuse on the TSTV access line.

In step s405, the AN deducts the TSTV unicast resources from the multicast resources being used on a corresponding user port managed by the AN itself, and records a corresponding state to process an IGMP packet. Further, the AN may act as an agent of an RTSP request sent to the server by identifying an address of the media server. After executing this step, the multicast stream may be interrupted to prevent an IGMP leave packet of the user from getting lost (step s413).

In step s406, the AN responds to the resource manager.

In step s407, the resource manager sends an installation request to an SR to turn on a gating switch and allow a server video stream to enter the network. In this step, the resource manager may get a media server address from quintuple information, and then get an SR address by which the media server is connected to the network through local configuration information.

In step s408, the SR performs a gating operation to turn on the gating.

In step s409, the SR responds to the resource manager.

In step s410, the resource manager responds to the service controller.

In step s411, the service controller responds to the UE, indicating that the TSTV unicast media stream resources have been reserved, and informs the UE of the media server address.

In step s412, the UE performs RTSP signaling interaction with the media server to establish a control connection.

In step s413, the UE sends the IGMP leave packet to the AN. The AN performs a special resource operation according to a stored state recorded in step s405 to interrupt the sending of multicast media stream to the UE.

In step s414, the time-shifted media stream is sent to the UE by the media server, and may also be sent to the UE by an RTSP agent.

Figure 5:
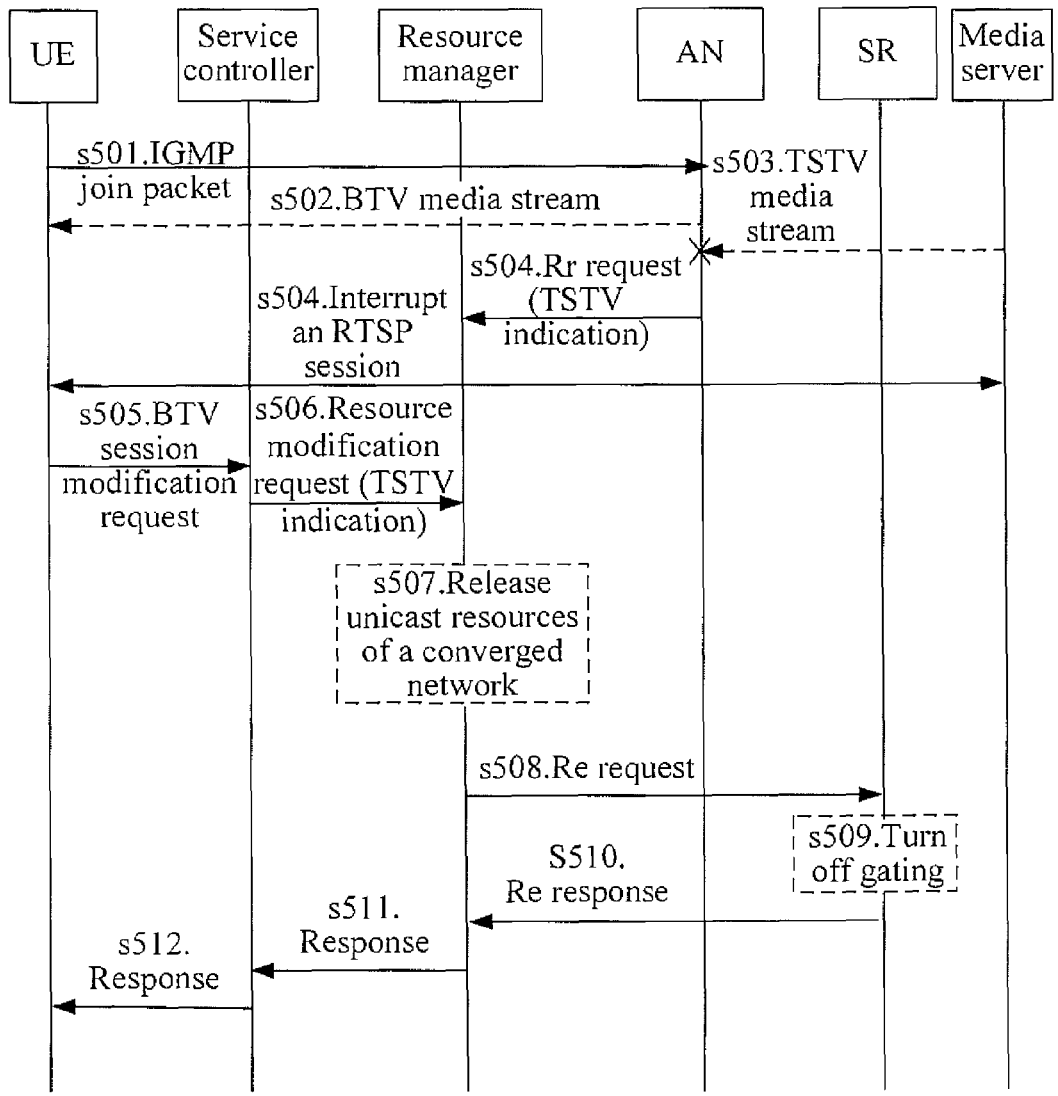
FIG. 5 is a flow chart of switching from the TSTV service to the BTV service by using the resource reuse solution according to the second embodiment of the present invention.

The process of switching from a TSTV service to a BTV service is as shown in FIG. 5, which includes the following steps.

In step s501, the UE sends an IGMP join packet to watch a BTV program of a current channel or other channels.

In step s502, the AN performs normal channel switching to send the BTV program to the UE.

In step s503, the AN stops sending a TSTV unicast media stream to a user port where the UE is located.

In step s504, the UE interrupts an RTSP session, and the media server does not send a unicast stream any more.

In step s505, the UE sends a session modification request to the service controller to terminate the time-shifting.

In step s506, the service controller sends a resource modification request to the resource manager, where the request carries a resource reuse indication.

In step s507, the resource manager releases the unicast resources except for the access line.

In step s508, the resource manager sends a request to the SR for turning off the gating.

In step s509, the SR performs a gating operation to turn off the gating.

In step s510, the SR responds to the resource manager through a Re interface.

In step s511, the resource manager responds to the service controller.

In step s512, the service controller responds to the UE. So far, the session restores to the original BTV session state.

Figure 6:
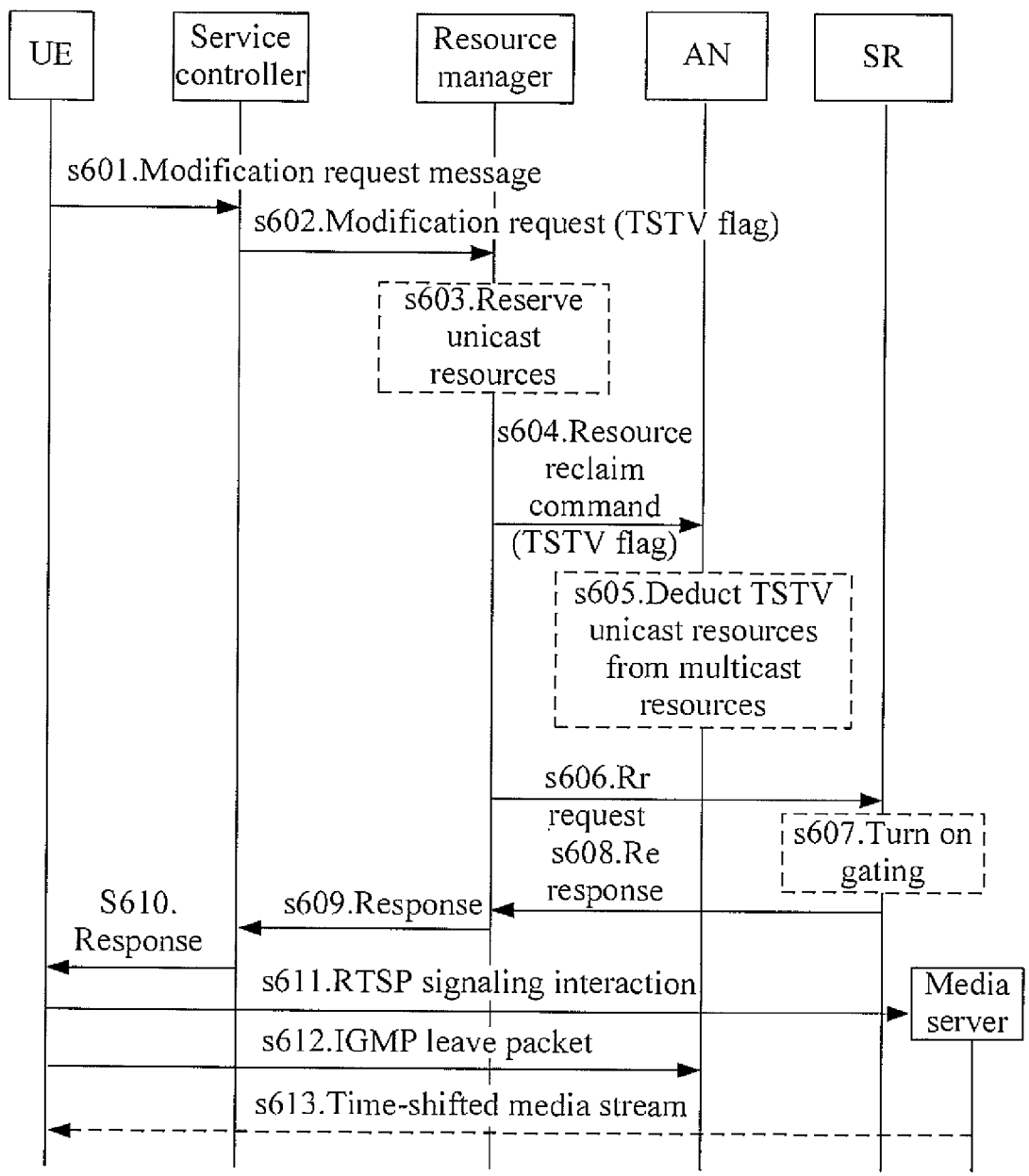
FIG. 6 is a flow chart of switching from a BTV service to a TSTV service by using a resource reuse solution according to a third embodiment of the present invention.

In a third embodiment of the present invention, access line resources are completely managed by a resource manager. The process of switching from a BTV service to a TSTV service is as shown in FIG. 6, which includes the following steps.

In step s601, a UE initiates a modification request message in a BTV session.

Specifically, an identification of a channel program being watched and a time-shifted request are carried in the modification request message to notify a service controller to choose a media server for a unicast video and reserve a bandwidth for a media channel. The identification of the channel program being watched by the UE may also be sent previously for the operator to collect statistics on audience ratings.

In step s602, the service controller chooses the media server, places a server address in a quintuple (including a source address, a source port, a destination address, a destination port and a protocol), and sends the modification request message to the resource manager by using an original BTV resource request session. The message carries a resource reuse indication (such as a TSTV flag or a resource overbook flag, or an original multicast stream is modified into a unicast stream, and the resource manager considers by default this modification as reuse of the multicast resources for unicast on the access line) to instruct the resource manager to reuse the resources currently allocated to the multicast stream on the access line when applying for resources for the TSTV service.

In step s603, the resource manager reserves the unicast resources except for the access line for the request, and reuses the multicast resources of the access line as the unicast resources to implement resource reuse on the access line.

In step s604, the resource manager sends a TSTV indication to an AN.

In step s605, the AN records a corresponding state to process an IGMP packet according to the indication. Further, the AN may act as an agent of an RTSP request sent to the server by identifying an address of the media server. After executing this step, the multicast stream may be interrupted to prevent an IGMP leave packet of the user from getting lost (step s612).

In step s606, the resource manager sends an installation request to an SR to turn on a gating switch and allow a server video stream to enter the network. In this step, the resource manager may get a media server address from quintuple information, and then get an SR address by which the media server is connected to the network through local configuration information.

In step s607, the SR performs a gating operation to turn on the gating.

In step s608, the SR responds to the resource manager.

In step s609, the resource manager responds to the service controller.

In step s610, the service controller responds to the UE, indicating that the TSTV unicast media stream resources have been reserved, and informs the UE of the media server address.

In step s611, the UE performs RTSP signaling interaction with the media server to establish a control connection.

In step s612, the UE sends the IGMP leave packet to the AN. The AN performs a special resource operation according to a stored state recorded in step s605, so that a resource release application that originally needs to be sent to the resource manager is not required anymore, and the sending to a multicast medium of the UE is interrupted.

In step s613, the time-shifted media stream is sent to the UE by the media server, and may also be sent to the UE by an RTSP agent.

Figure 7:
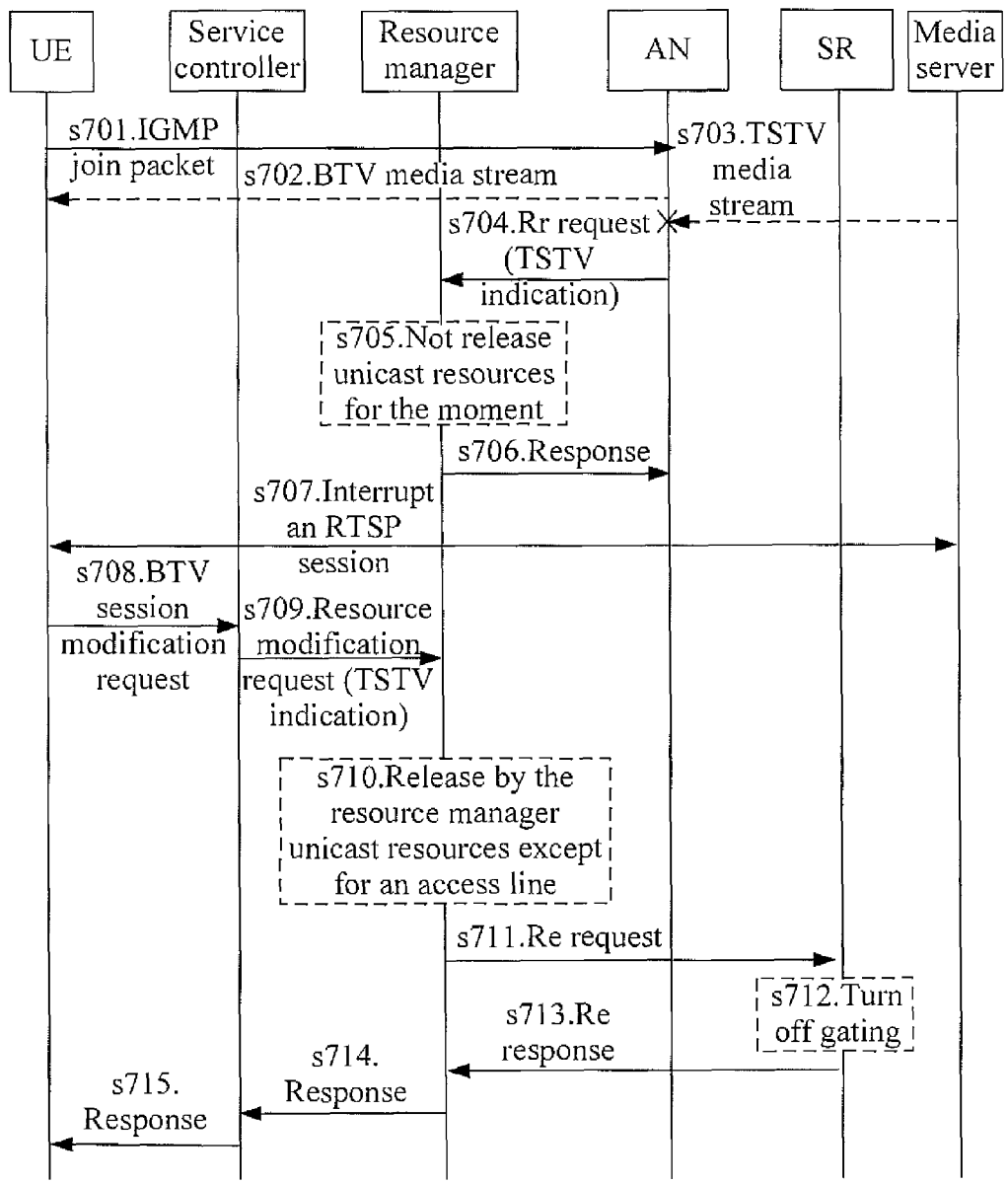
FIG. 7 is a flow chart of switching from the TSTV service to the BTV service by using the resource reuse solution according to the third embodiment of the present invention.

The process of switching from a TSTV service to a BTV service is as shown in FIG. 7, which includes the following steps.

In step s701, the UE sends an IGMP join packet to watch a BTV program of a current channel or other channels.

In step s702, the AN performs channel switching to send the BTV program to the UE.

In step s703, the AN stops sending a TSTV unicast media stream to a user port where the UE is located.

In step s704, the AN sends a resource release request to the resource manager, where the request carries a resource reuse operation indication, so as to require reclaiming the unicast resources occupied by the TSTV as multicast resources.

In step s705, the resource manager responds to the AN. After this step, the resource manager may choose to release the allocated unicast resources except for the access line. Taking that the user may perform time-shifting again into account, the resources are not released for the moment herein.

In step s706, the resource manager responds to the AN.

In step s707, the UE interrupts an RTSP session, and the media server does not send a unicast stream any more.

In step s708, the UE sends a session modification request to the service controller to terminate the time-shifting.

In step s709, the service controller sends a resource modification request to the resource manager, where the request carries a resource reuse indication.

In step s710, the resource manager releases the unicast resources except for the access line.

In step s711, the resource manager sends a request to the SR for turning off the gating.

In step s712, the SR performs a gating operation to turn off the gating.

In step s713, the SR responds to the resource manager through a Re interface.

In step s714, the resource manager responds to the service controller.

In step s715, the service controller responds to the UE. So far, the session restores to the original BTV session state.

In the above embodiments of the present invention, the BTV service and the TSTV service share one session in a service layer, and the association between the BTV and the TSTV is implemented through session modification, thereby realizing resource sharing.

Figure 8:
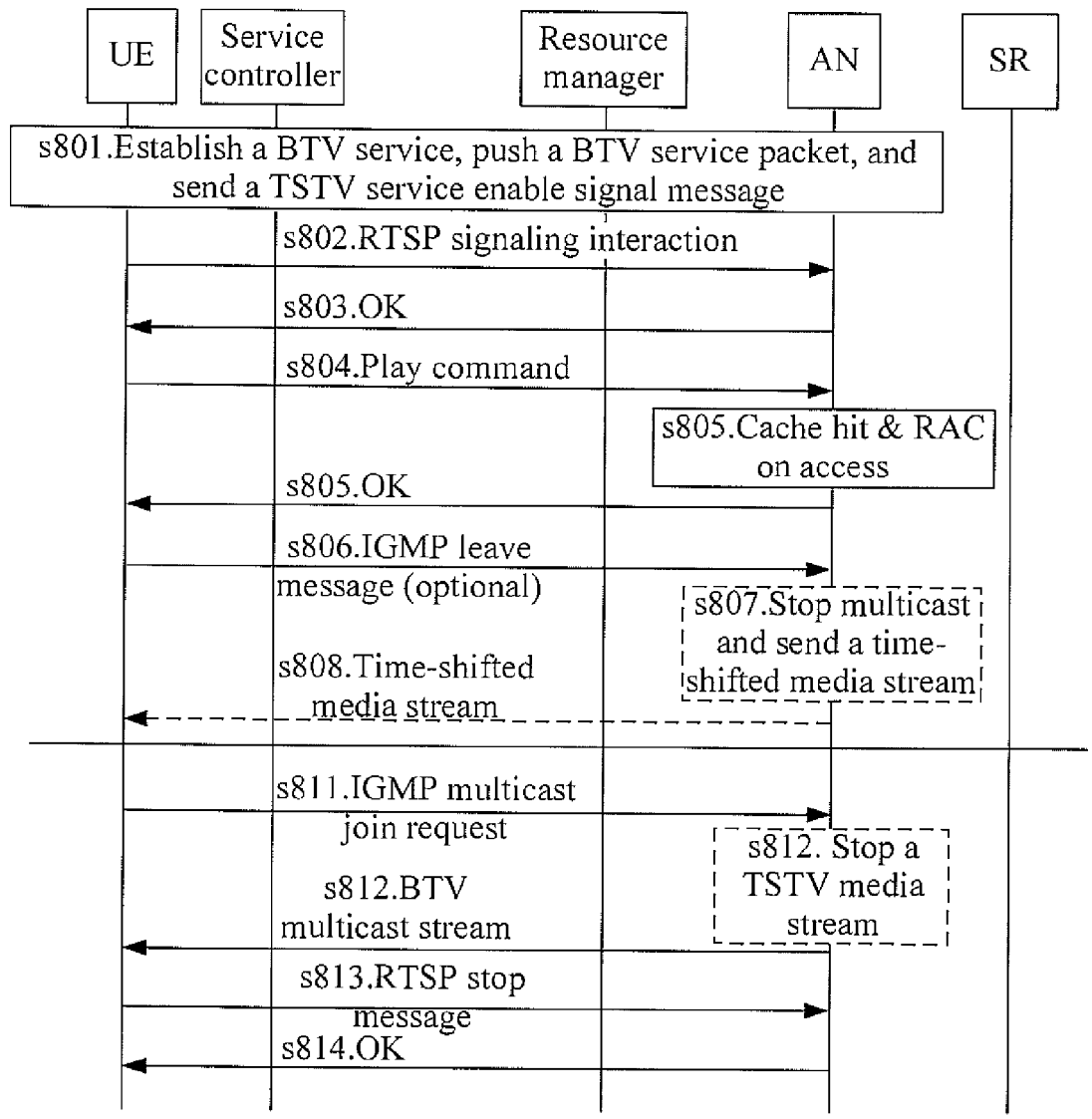
FIG. 8 is a flow chart of sharing resources with a BTV in a TSTV pull mode according to a fourth embodiment of the present invention.

In a fourth embodiment of the present invention, a TSTV service implements resource sharing in a pull mode without sharing a session with a BTV service. FIG. 8 is a flow chart of sharing resources (AN cache program sources) with a BTV in a TSTV pull mode.

The process of switching from the BTV to the TSTV includes the following steps.

In step s801, a BTV session is established, and a BTV service packet and the TSTV service are enabled to be pushed to an AN.

In step s802, a UE sends an RTSP setup request to the AN.

In step s803, the AN responds to the UE with OK.

In step s804, the UE sends a play command to the AN.

In step s805, if the media content required to be played is in the AN, the AN directly admits resources at the access side and sends OK to the UE.

In step s806, the UE sends a multicast leave message. This step is optional.

In step s807, the AN stops sending a BTV media stream and sends a TSTV media stream.

In step s808, the AN sends the TSTV media stream to the UE.

The process of switching from the TSTV service to the BTV service includes the following steps.

In step s811, the UE sends an IGMP multicast join request to the AN.

In step s812, the AN stops sending the TSTV media stream and sends the BTV multicast stream to the UE.

In step s813, the UE sends an RTSP stop message to the AN.

In step s814, the AN responds with OK.

So far, the session completely restores to the original BTV session state.

Figure 9:
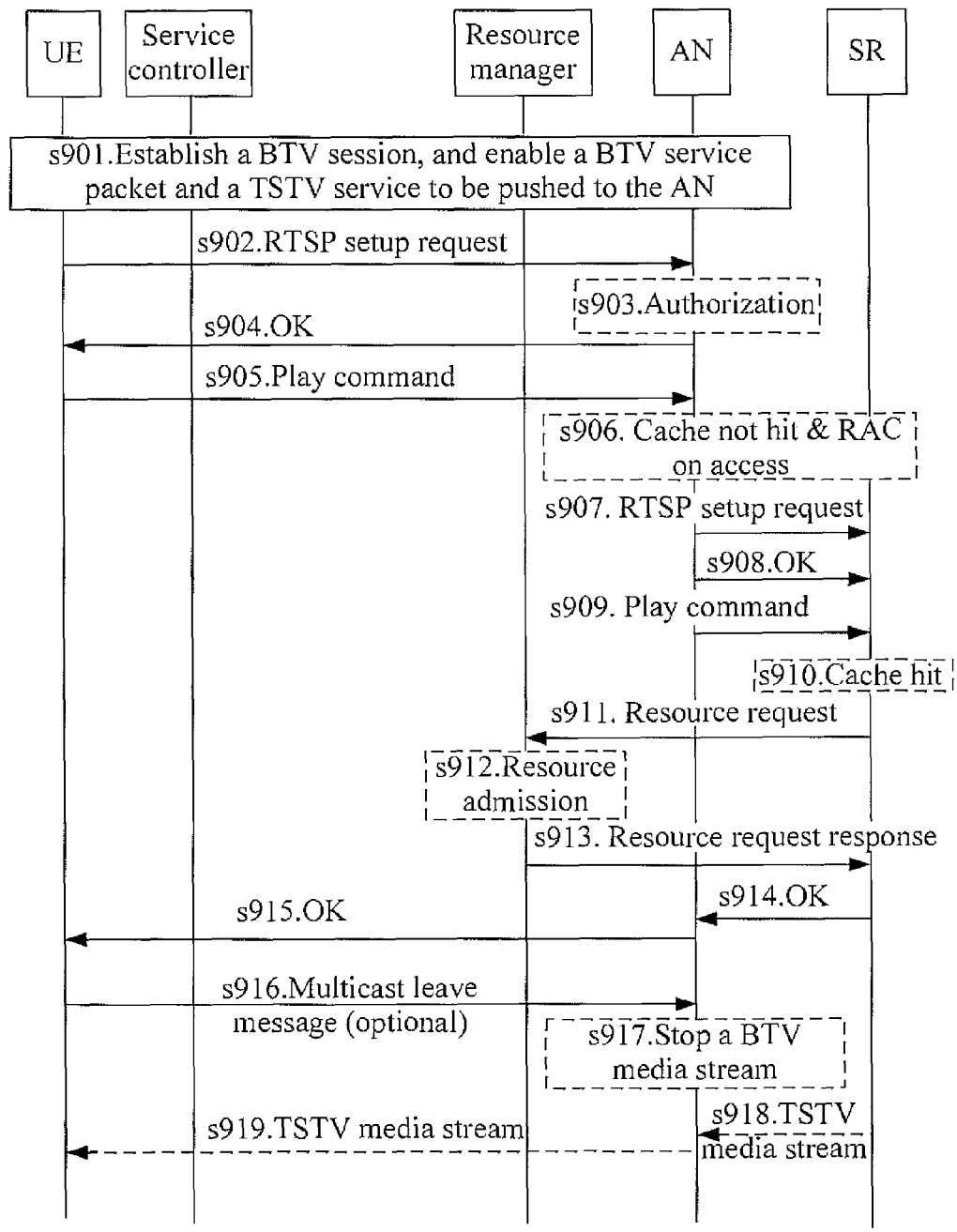
FIG. 9 is a flow chart of switching from the BTV to a TSTV in the TSTV pull mode according to the fourth embodiment of the present invention.

FIG. 9 is a flow chart of switching from the BTV service to the TSTV service (SR cache program sources) in the TSTV pull mode according to the fourth embodiment of the present invention, which includes the following steps.

The process of switching from the BTV service to the TSTV service is described in detail as follows.

In step s901, a BTV session is established, and a BTV service packet and the TSTV service are enabled to be pushed to the AN.

In step s902, the UE sends an RTSP setup request to the AN.

In step s903, the AN performs authorization.

In step s904, the AN responds with OK.

In step s905, the UE sends a play command to the AN.

In step s906, the AN determines that the media content required to be played is not in the AN.

In step s907, the AN sends an RTSP setup request to the SR.

In step s908, the SR sends OK to the AN.

In step s909, the AN sends a play command to the SR.

In step s910, the SR determines that the media content required to be played is in the SR.

In step s911, the SR sends a resource request to the resource manager, where the request carries a resource reuse operation indication.

In step s912, the resource manager admits resources, and reserves resources for network segments except for the access line.

In step s913, the resource manager sends a resource request response to the SR.

In step s914, the SR responds to an RTSP play command of the AN.

In step s915, the AN responds to an RTSP play command of the UE.

In step s916, the UE sends a multicast leave message (this step is optional).

In step s917, the AN stops sending a BTV media stream.

In step s918, the SR sends a TSTV media stream to the AN.

In step s919, the AN sends the TSTV media stream to the UE.

Figure 10:
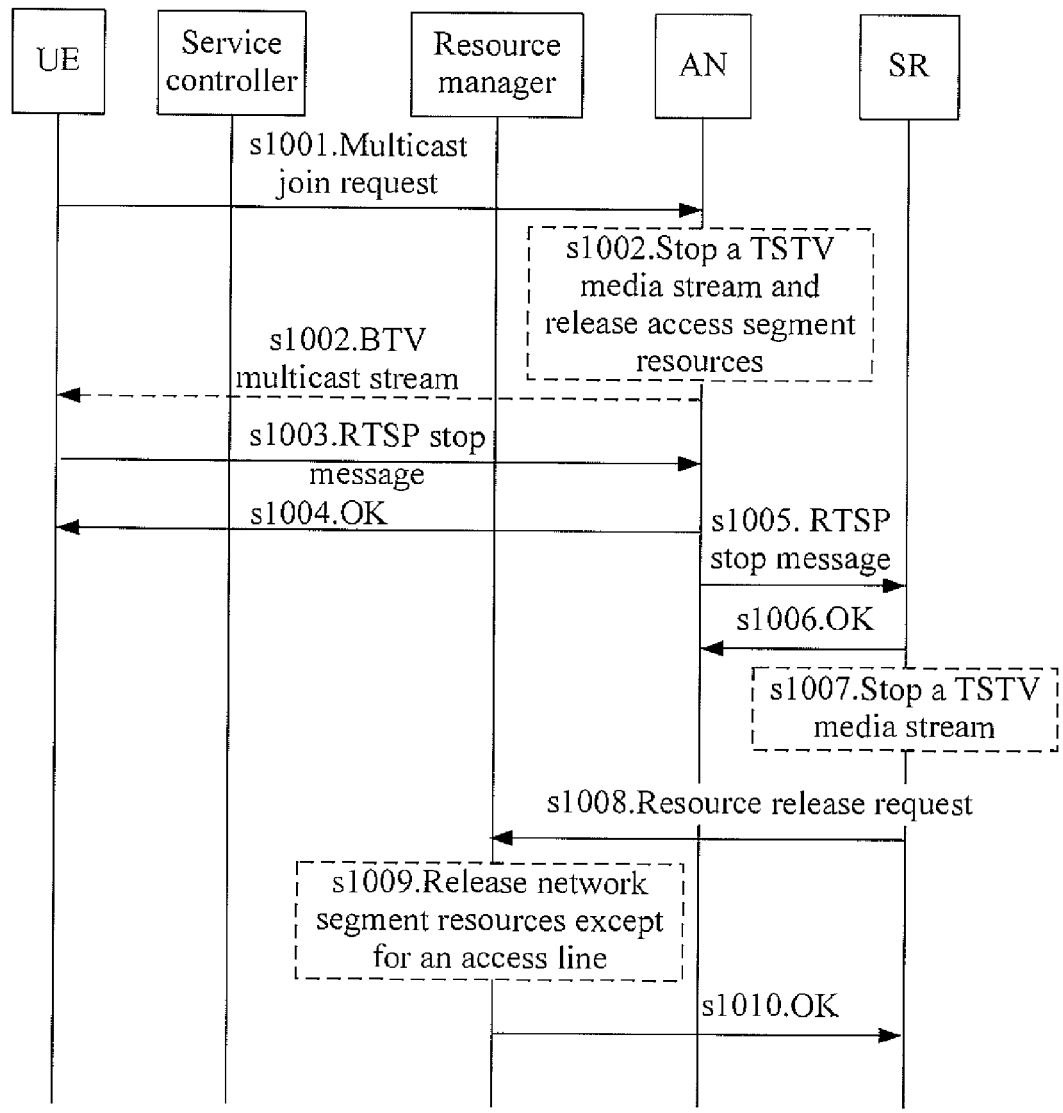
FIG. 10 is a flow chart of switching from the TSTV to the BTV in the TSTV pull mode according to the fourth embodiment of the present invention.

FIG. 10 is a flow chart of switching from the TSTV service to the BTV service (SR cache program sources) in the TSTV pull mode according to the fourth embodiment of the present invention, which includes the following steps.

In step s1001, the UE sends a multicast join request to the AN.

In step s1002, the AN stops sending a TSTV media stream, releases access segment resources, and sends a BTV multicast stream to the UE.

In step s1003, the UE sends an RTSP stop message to the AN.

In step s1004, the AN sends an RTSP stop response to the UE.

In step s1005, the AN sends the RTSP stop message to the SR.

In step s1006, the SR sends an RTSP stop response to the AN.

In step s1007, the SR stops sending the TSTV media stream.

In step s1008, the SR sends a resource release request to the resource manager, where the request carries a resource reuse operation indication.

In step s1009, the resource manager releases network segment resources except for the access line.

In step s1010, the resource manager sends a resource release response to the SR.

So far, the session completely restores to the original BTV session state.

In the above method provided according to the embodiments of the present invention, a resource request carrying a service indication is sent to a resource manager to enable reuse of multicast service resources and unicast service resources, so as to avoid the problem of insufficient access line resources that may occur during the service switching. Further, the reuse of the resources reduces the time of dark screen for the user terminal, and improves the user experience. The embodiments of the present invention can be organically integrated with the original BTV resource admission control mechanism to form a complete BTV+TSTV solution which has practical application value.

Figure 11:
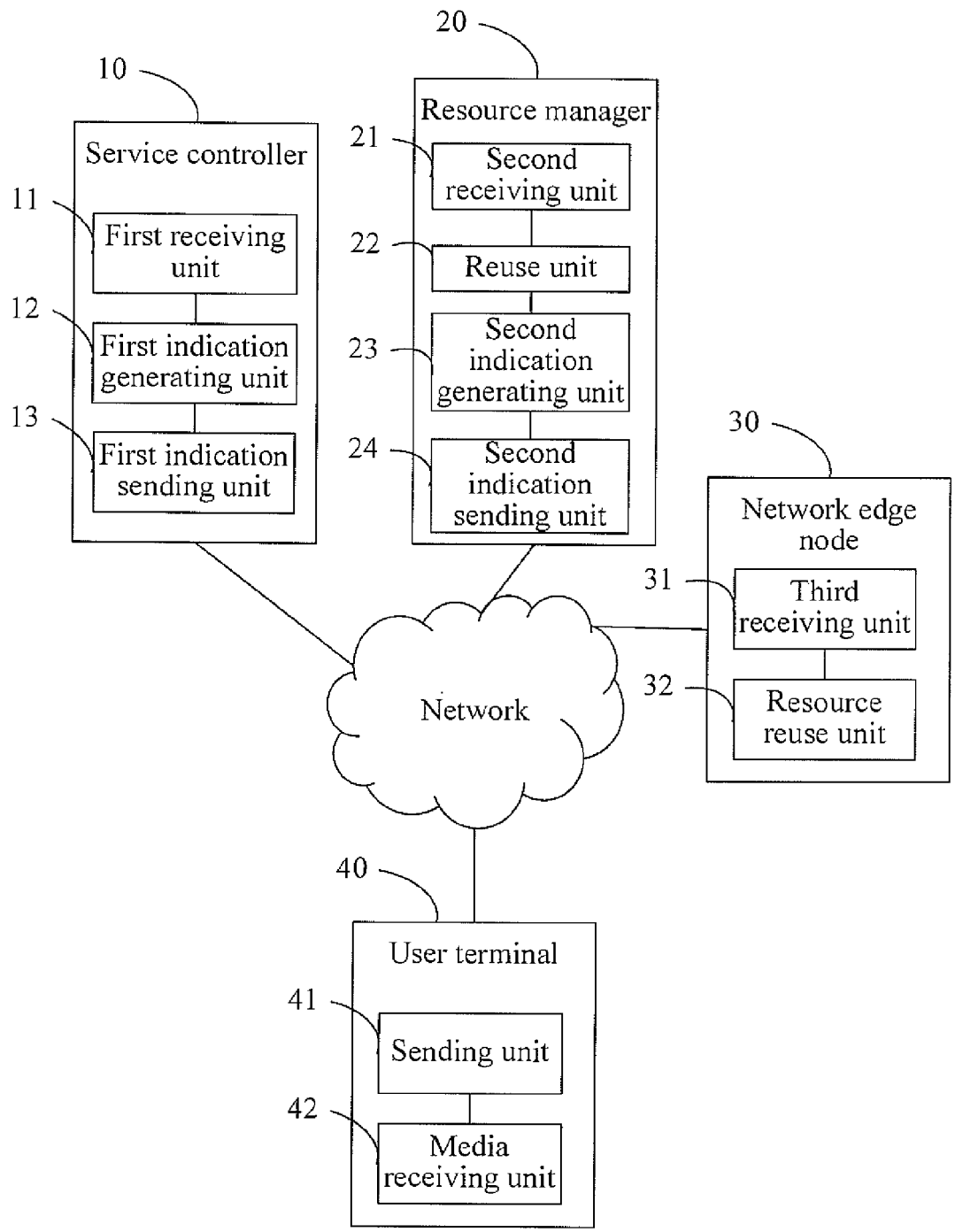
FIG. 11 is a schematic view of the structure of a service switching system according to a fifth embodiment of the present invention.

In an embodiment, the present invention further provides a service switching system, which includes a service controller 10, a resource manager 20, a network edge node 30, and a user terminal 40, as shown in FIG. 11.

The service controller 10 is configured to receive a request for switching between a unicast service and a multicast service, and send an access line resource reuse indication as a control message to the resource manager, so as to instruct the resource manager to reuse access line resources between the unicast and the multicast services.

The resource manager 20 is configured to receive the access line resource reuse indication sent by the service controller 10, reuse the access line resources between the unicast and the multicast services, and send a resource reuse operation indication as a control message to the network edge node 30, so as to instruct the network edge node 30 to reuse the multicast resources.

The network edge node 30 is configured to reuse the currently used multicast resources for the unicast service according to the indication sent by the resource manager 20, or reuse the currently used unicast resources for the multicast service according to a multicast join request sent by the user terminal 40.

The user terminal 40 is configured to send the request for switching between the unicast service and the multicast service to the service controller 10 to request the switching of the unicast service and the multicast service, or send the multicast join request to the network edge node 30 to request the join of the multicast service.

The service controller 10 further includes a first receiving unit 11, a first indication generating unit 12, and a first indication sending unit 13.

The first receiving unit 11 is configured to receive from the user terminal 40 the request for switching from the multicast service to the unicast service.

The first indication generating unit 12 is configured to generate the resource reuse indication sent to the resource manager according to the request received by the first receiving unit 11. The resource reuse indication serves as the control message, and is used for instructing the resource manager to reuse the access line resources during switching between the unicast service and the multicast service.

The first indication sending unit 13 is configured to send the resource reuse indication generated by the first indication generating unit 12 to the resource manager.

The resource manager 20 further includes a second receiving unit 21, a reuse unit 22, a second indication generating unit 23, and a second indication sending unit 24.

The second receiving unit 21 is configured to receive the control message sent by the service controller 10. The control message is specifically the resource reuse indication.

The reuse unit 22 is configured to reuse the access line resources during switching between the unicast service and the multicast service according to the control message received by the second receiving unit 21.

The second indication generating unit 23 is configured to generate the resource reuse operation indication sent to the network edge node according to the resource reuse indication received by the second receiving unit 21. The resource reuse operation indication serves as the control message, and is used for instructing the network edge node to reuse the resources.

The second indication sending unit 24 is configured to send the resource reuse operation indication generated by the second indication generating unit 23 to the network edge node.

The network edge node 30 further includes a third receiving unit 31 and a resource reuse unit 32.

The third receiving unit 31 is configured to receive the control message. The control message is specifically the resource reuse indication sent by the resource manager 20, or the multicast join request sent by the user terminal.

The resource reuse unit 32 is configured to reuse the multicast resources for the unicast service according to the resource reuse indication received by the third receiving unit 31, or reuse the unicast resources for the multicast service according to the multicast join request received by the third receiving unit 31.

The user terminal 40 further includes a sending unit 41 and a media receiving unit 42.

The sending unit 41 is configured to send the request for switching between the unicast service and the multicast service to the service controller 10 to request the switching of the unicast service and the multicast service, or send the multicast join request to the network edge node 30 to request the join of the multicast service.

The media receiving unit 42 is configured to receive the unicast media stream and the multicast media stream.

In an embodiment, the present invention further provides a network device, which is configured to reuse access line resources during switching between a unicast service and a multicast service. The network device includes a receiving unit and a processing unit. The receiving unit is configured to receive a control message for switching between the unicast service and the multicast service. The processing unit is configured to reuse the access line resources during switching between the unicast service and the multicast service according to the control message sent by the receiving unit.

The network device is specifically a resource controller or a network edge node. The structures of the resource controller and the network edge node are as shown in FIG. 11.

In the above system and device provided according to the embodiments of the present invention, a resource request carrying a resource reuse indication is sent to enable reuse of multicast service resources and unicast service resources, so as to avoid the problem of insufficient access line resources that may occur during the service switching. Further, the reuse of the resources reduces the time of dark screen for the user terminal, and improves the user experience. The embodiments of the present invention can be organically integrated with the original BTV resource admission control mechanism to form a complete BTV+TSTV solution which has practical application value.

Through the above description of the implementation, it is clear to persons skilled in the art that the present invention may be accomplished through hardware, or through software plus a necessary universal hardware platform. Based on this, the technical solutions of the present invention may be embodied in the form of a software product. The software product may be stored in a nonvolatile storage medium (for example, CD-ROM, USB flash drive, or removable hard disk) and contain several instructions for instructing computer equipment (for example, a personal computer, a server, or network equipment) to perform the method according to the embodiments of the present invention.

To sum up, the above descriptions are merely some exemplary embodiments of the present invention, but are not intended to limit the present invention. Any modification, equivalent replacement, or improvement made without departing from the spirit and principle of the present invention shall fall within the scope of the present invention.

What is claimed is:

1. A service switching system, comprising:
a service controller, configured to receive a request for switching between a unicast service and a multicast service, and send a resource reuse indication as a control message to a resource manager, to instruct the resource manager to reuse access line resources during switching between the unicast service and the multicast service;
the resource manager, configured to receive the resource reuse indication sent by the service controller, and send a resource reuse operation indication as a control message to a network edge node, to reuse the access line resources during switching between the unicast service and the multicast service;
the network edge node, configured to reuse the access line resources during switching between the unicast service and the multicast service according to the resource reuse operation indication sent by the resource manager, or according to a multicast join request message sent by a user terminal; and
the user terminal, configured to send the request for switching between the unicast service and the multicast service to the service controller, or send the multicast join request to the network edge node, to request to switch between the unicast service and the multicast service.

2. The service switching system according to claim 1, wherein the network edge node comprises: an access node (AN), a broadband remote access server (BRAS), a broadband network gateway (BNG), or a service router (SR); and the access line comprises a line or a radio channel through which the user terminal reaches the network edge node.

3. A service switching method, comprising:
receiving a control message for switching between a unicast service and a multicast service, comprising, receiving, by a resource manager, a message carrying a resource reuse indication sent by a service controller, wherein the message carrying the resource reuse indication serves as the control message, to instruct the resource manager to reuse the access line resources of the multicast service when the multicast service is switched to the unicast service; and
reusing access line resources of the multicast service when the multicast service is switched to the unicast service, or reusing access line resources of the unicast service when the unicast service is switched to the multicast service according to the control message, wherein reusing the access line resources of the multicast service when the multicast service is switched to the unicast service according to the control message comprises:
sending, by the resource manager, a resource reuse operation indication to a network edge node according to the resource reuse indication, to indicate that the currently used multicast resources needs to be classified into unicast resources, and
classifying, by the resource manager, the multicast resources released by the network edge node into the unicast resources, to implement reuse of the access line resources of the multicast service when the multicast service is switched to the unicast service.

4. The service switching method according to claim 3, wherein receiving, by the resource manager, the message carrying the resource reuse indication sent by the service controller comprises:
receiving, by the service controller, a request from a user terminal for switching from the multicast service to the unicast service; and
sending the resource reuse indication to the resource manager, to indicate that the access line resources of the multicast service need to be reused when the multicast service is switched to the unicast service.

5. The service switching method according to claim 3, wherein the resource reuse indication comprises:
a modification message, sent based on an existing multicast session, for modifying a multicast stream to a unicast stream, a resource overbook indication, or indication information for indicating a TSTV service; and
wherein the resource reuse operation indication comprises: a resource overbook indication, or an indication for indicating a TSTV service.

6. A service switching method, comprising:
receiving a control message for switching between a unicast service and a multicast service, wherein receiving the control message for switching between the unicast service and the multicast service comprises:
receiving, by a network edge node, a multicast join message sent by a user terminal, wherein the multicast join message serves as the control message, to instruct the network edge node to reuse the access line resources of the unicast service when the unicast service is switched to the multicast service; and
reusing access line resources of the multicast service when the multicast service is switched to the unicast service, or reusing access line resources of the unicast service when the unicast service is switched to the multicast service according to the control message, wherein reusing the access line resources of the unicast service when the unicast service is switched to the multicast service according to the control message comprises:
sending, by the network edge node, a request for releasing the unicast resources to the resource manager, to indicate that the currently used unicast resources needs to be classified into the multicast resources, and
classifying, by the network edge node, the unicast resources released by the resource manager into the multicast resources, to implement reuse of the access line resources of the unicast service when the unicast service is switched to the multicast service.

7. A service switching method, comprising:
receiving a control message for switching between a unicast service and a multicast service, wherein receiving the control message for switching between the unicast service and the multicast service comprises:
receiving, by a network edge node, a message carrying a resource reuse operation indication sent by a resource manager, wherein the message carrying the resource reuse operation indication serves as the control message, to instruct the network edge node to reuse the access line resources of the multicast service when the multicast service is switched to the unicast service; and reusing access line resources of the multicast service when the multicast service is switched to the unicast service, or reusing access line resources of the unicast service when the unicast service is switched to the multicast service according to the control message, wherein reusing the access line resources of the multicast service when the multicast service is switched to the unicast service according to the control message comprises:

classifying, by the network edge node, the currently used multicast resources into the unicast resources according to the resource reuse operation indication, to implement reuse of the access line resources when the multicast service is switched to the unicast service.

8. The service switching method according to claim 7, wherein the receiving, by the network edge node, the message carrying the resource reuse operation indication sent by the resource manager comprises:

receiving, by a service controller, a request from a user terminal for switching from the multicast service to the unicast service, and sending a resource reuse indication to the resource manager, to indicate that the access line resources of the multicast service need to be reused when the multicast service is switched to the unicast service; and sending, by the resource manager, the resource reuse operation indication to the network edge node according to the resource reuse indication, to indicate that the access line resources of the multicast service need to be reused when the multicast service is switched to the unicast service.

9. A service switching method, comprising:
receiving a control message for switching between a unicast service and a multicast service, wherein receiving the control message for switching between the unicast service and the multicast service comprises:

receiving, by a resource manager, a message carrying a resource reuse operation indication sent by a network edge node, wherein the message carrying the resource reuse operation indication serves as the control message, to indicate that the access line resources of the unicast service needs to be reused when the unicast service is switched to the multicast service; and reusing access line resources of the multicast service when the multicast service is switched to the unicast service, or reusing access line resources of the unicast service when the unicast service is switched to the multicast service according to the control message, wherein reusing the access line resources during switching between the unicast service and the multicast service according to the control message comprises:

classifying, by the resource manager, the currently used unicast resources into the multicast resources, to implement reuse of the access line resources when the unicast service is switched to the multicast service.

10. A service switching system, comprising:
a service controller configured to: receive, from a user terminal, a request for switching between a unicast service and a multicast service, and send a resource reuse indication as a control message to a resource manager to instruct the resource manager to reuse access line resources during switching between the unicast service and the multicast service;

the resource manager configured to: receive the resource reuse indication sent by the service controller, and send a resource reuse operation indication as a control message to a network edge node to reuse the access line resources during switching between the unicast service and the multicast service;

the network edge node configured to reuse the access line resources during switching between the unicast service and the multicast service according to the resource reuse operation indication sent by the resource manager or according to a multicast join request message sent by a user terminal.

11. The service switching system according to claim 10, wherein the network edge node comprises: an access node (AN), a broadband remote access server (BRAS), a broadband network gateway (BNG), or a service router (SR); and the access line comprises: a line or a radio channel through which the user terminal reaches the network edge node.

* * * * *